United States Patent
Chiang

(12) United States Patent (10) Patent No.: US 7,019,295 B2
Chiang (45) Date of Patent: Mar. 28, 2006

(54) DIGITALLY-CONTROLLED PYROELECTRIC SIGNAL SAMPLING CIRCUIT

(75) Inventor: Shen-Kwan Chiang, Taipei Hsien (TW)

(73) Assignee: King Can Industry Corporation, Taipei Hsien (TW)

(*) Notice: Subject to any disclaimer, the term of this patent is extended or adjusted under 35 U.S.C. 154(b) by 286 days.

(21) Appl. No.: 10/656,437

(22) Filed: Sep. 5, 2003

(65) Prior Publication Data

US 2004/0124377 A1 Jul. 1, 2004

(30) Foreign Application Priority Data

Dec. 25, 2002 (TW) .............................. 91137253 A

(51) Int. Cl.
*G01J 1/00* (2006.01)

(52) U.S. Cl. .................................................. 250/338.3

(58) Field of Classification Search ............. 250/338.3
See application file for complete search history.

(56) References Cited

U.S. PATENT DOCUMENTS 4,608,599 A * 8/1986 Kaneko et al. ............. 348/164

\* cited by examiner

*Primary Examiner*—Constantine Hannaher
(74) *Attorney, Agent, or Firm*—Sawyer Law Group LLP

(57) ABSTRACT

A digitally-controlled pyroelectric signal sampling circuit is proposed, which is designed to process the alternating current (AC) signal from a pyroelectric device, such as a pyroelectric infrared sensor, such that the AC signal is converted into direct current (DC) signal. The proposed digitally-controlled pyroelectric signal sampling circuit is characterized by the use of a microprocessor in conjunction with a crystal oscillator whose operating characteristics would be substantially unaffected by temperature changes in the ambient environment. This feature allows the generated trigger signal and sampling signals to be substantially fixed in frequencies and timings, without drifting due to temperature changes in the ambient environment, and therefore allows the digitally-controlled pyroelectric signal sampling circuit of the invention to provide a more accurate DC output than prior art. Moreover, the utilization of a microprocessor in place of analog-type delay circuitry can help simplify the hardware architecture and thus save manufacturing cost.

4 Claims, 5 Drawing Sheets

DIGITALLY-CONTROLLED PYROELECTRIC SIGNAL SAMPLING CIRCUIT

BACKGROUND OF THE INVENTION

1. Field of the Invention

This invention relates to electronics technology, and, more particularly, to a digitally-controlled pyroelectric signal sampling circuit designed for use to process the alternating current (AC) pyroelectric signal generated by a pyroelectric device, such as a pyroelectric infrared sensor, such that the AC signal is converted into direct current (DC) signal.

2. Description of Related Art

A pyroelectric infrared sensor is an infrared-sensitive electronic device capable of generating analog electric signals in response to temperature changes in the ambient environment. Owing to this characteristic, pyroelectric infrared sensors are widely utilized as a key component in temperature detectors, achromatic infrared gas analyzers and devices for detecting carbon dioxide or carbon monoxide concentrations, to name just a few.

Conventional pyroelectric infrared sensors, however, are irresponsive to DC inputs, and, therefore, when the input signal is a DC type, it is necessary to convert the DC input into AC in order to allow the DC input to be detected by the pyroelectric infrared sensor, and then convert the AC output of the pyroelectric infrared sensor to DC in order to allow a DC output signal to be used to indicate the condition at the input end.

A solution to the foregoing problem is to utilize filters or rectifiers to convert the AC output of the pyroelectric infrared sensor into DC. However, one drawback of this solution is that it requires quite a lengthy period of time before the DC output reaches its steady state, and, therefore, it doesn't allow the output to instantaneously reflect information about the condition at the input in real time. A conventional solution to this problem has been disclosed in ROC Patent No. 127857, which is characterized by the use of a subtraction operation on the upper peak and the bottom peak in the waveform of the AC output to thereby obtain a DC output. This helps to allow the output to instantaneously reflect information about the condition at the input in real time.

One drawback to the ROC Patent No. 127857, however, is that its operating characteristics are affected by temperature changes in the ambient environment, thus undesirably resulting in inaccurate output-to-input characteristic. This problem is due to the use of an analog-type time delay and sampling circuitry to perform the subtraction operation on the upper peak and the bottom peak of the AC output, and analog-type circuitry is quite susceptible to temperature changes.

SUMMARY OF THE INVENTION

It is therefore an objective of this invention to provide a digitally-controlled pyroelectric signal sampling circuit whose operating characteristics would be substantially unaffected by temperature changes in the ambient environment.

It is another objective of this invention to provide a digitally-controlled pyroelectric signal sampling circuit that is capable of providing more accurate DC output characteristics than prior art.

It is still another objective of this invention to provide a digitally-controlled pyroelectric signal sampling circuit that is more cost-effective to implement than prior art.

The digitally-controlled pyroelectric signal sampling circuit according to the invention is characterized by the use of a microprocessor in conjunction with a crystal oscillator whose operating characteristics would be substantially unaffected by temperature changes in the ambient environment. This feature allows the generated trigger signal and sampling signals to be substantially fixed in frequencies and timings, without drifting due to temperature changes in the ambient environment, and, therefore allows the digitally-controlled pyroelectric signal sampling circuit of the invention to provide more accurate DC output than prior art. Moreover, the utilization of microprocessor in place of analog-type delay circuitry can help simplify the hardware architecture and thus save manufacturing cost.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

A preferred embodiment of the digitally-controlled pyroelectric signal sampling circuit according to the invention is disclosed in full details in the following with the accompanying drawings.

Figure 1:
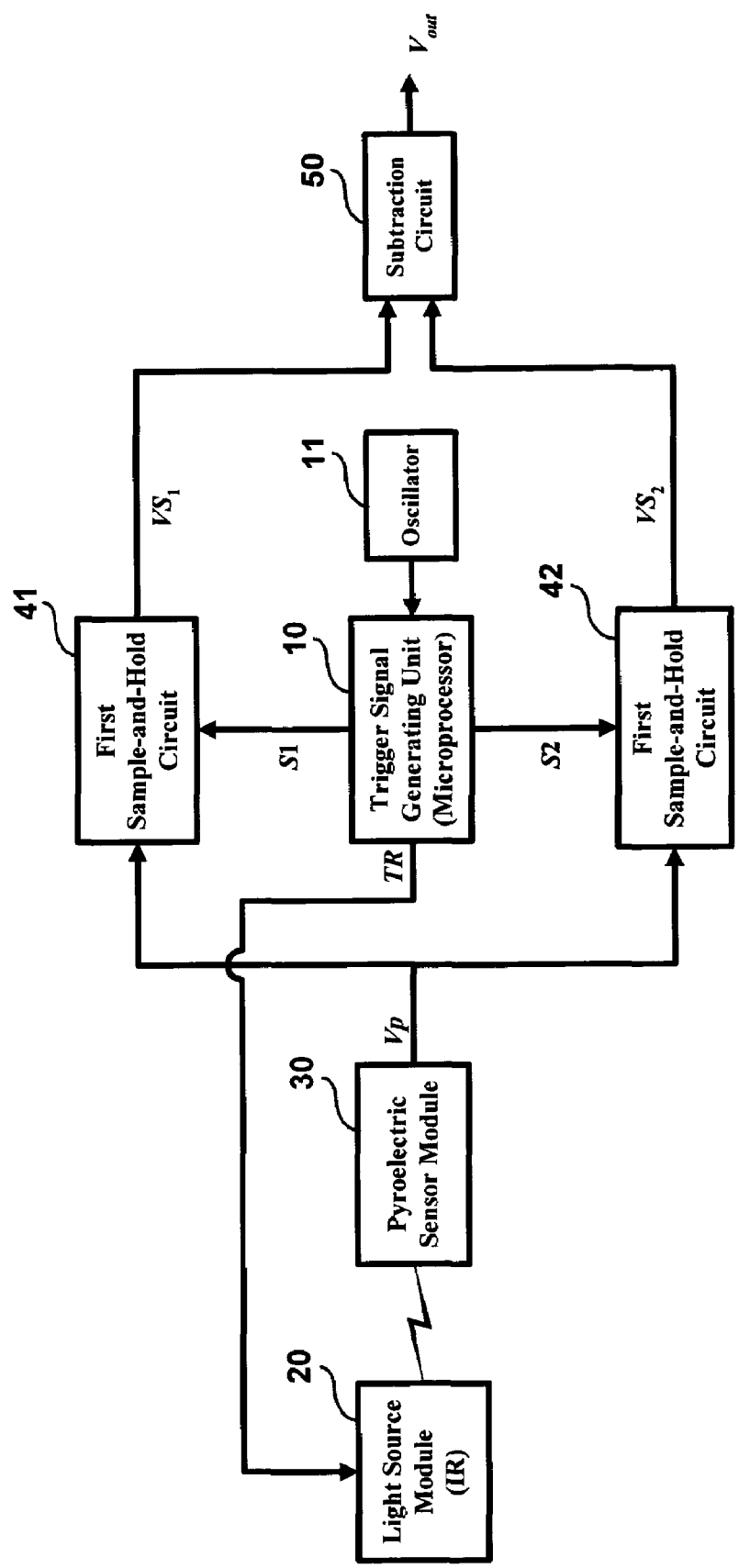
FIG. 1 is a schematic block diagram showing the architecture of the digitally-controlled pyroelectric signal sampling circuit according to the invention.

Referring first to FIG. 1, the digitally-controlled pyroelectric signal sampling circuit according to the invention comprises: (a) a trigger-signal generating unit 10; (b) a light source module 20; (c) a pyroelectric sensor module 30; (d) a first sample-and-hold circuit 41; (e) a second sample-and-hold circuit 42; and (f) a subtraction circuit 50.

The trigger-signal generating unit 10 is based on a crystal oscillator 11 to generate three pulse signals: a trigger signal TR for driving the light source module 20, a first sampling signal S1 for clocking the first sample-and-hold circuit 41, and a second sampling signal S2 for clocking the second sample-and-hold circuit 42. In this preferred embodiment, for example, a microprocessor is used to implement the trigger-signal generating unit 10. The benefit of using the crystal oscillator 11 to clock the microprocessor-based trigger-signal generating unit 10 is that the operating characteristics of the crystal oscillator 11 are substantially unaffected by temperature changes in the ambient environment, i.e., the output frequency of the crystal oscillator 11 substantially maintains a fixed value even though the temperature of the environment changes. This characteristic allows the trigger signal TR, the first sampling signal S1, and the second sampling signal S2 to be substantially maintained at their specified fixed frequencies and timings even though the temperature of the environment changes. The output trigger signal TR from the trigger-signal generating unit 10 is connected to the light source module 20.

The light source module 20 is, for example, an infrared light source module, which is capable of being triggered by the trigger signal TR to emit an alternating infrared beam. The pyroelectric sensor module 30 is capable of sensing the output of the alternating infrared beam from the light source module 20 to generate an alternating current (AC) voltage signal (hereinafter referred to as pyroelectric signal) $V_{pyro}$. The pyroelectric sensor module 30 includes an amplification function capable of amplifying the alternating pyroelectric signal $V_{pyro}$ by a specified gain to a higher magnitude so that it can be adequately processed by the first sample-and-hold circuit 41 and the second sample-and-hold circuit 42.

The first sample-and-hold circuit 41 and the second sample-and-hold circuit 42 are respectively clocked by the first sampling signal S1 and the second sampling signal S2, which are both generated by the trigger-signal generating unit 10, to perform a sample-and-hold operation on the alternating pyroelectric output signal $V_{pyro}$ from the pyroelectric sensor module 30, thereby outputting a first sampled signal VS1 and a second sampled signal VS2.

Figure 2A:
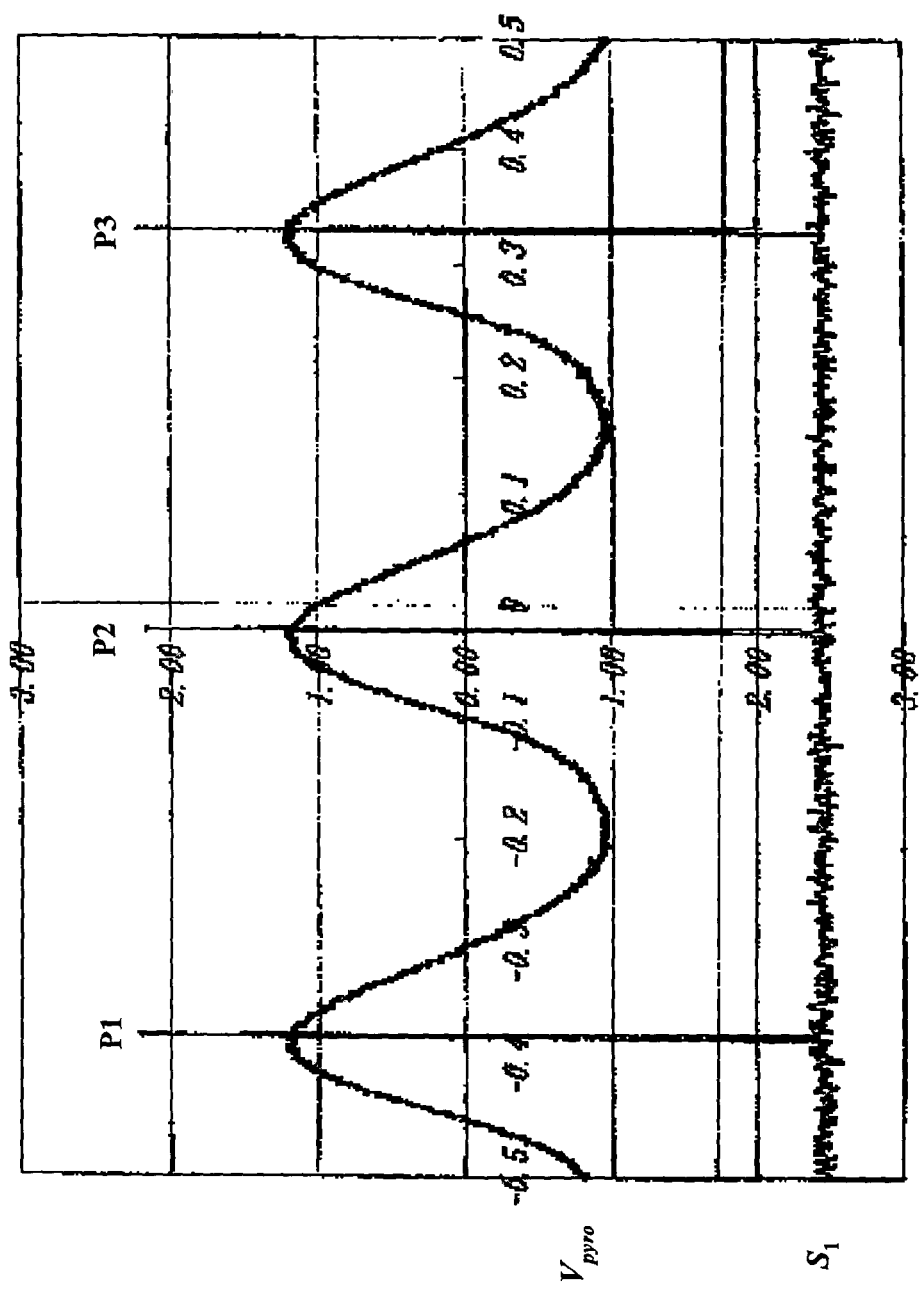
FIG. 2A is a waveform diagram used to depict how the first sample-and-hold circuit utilized by the invention is operated to sample an alternating pyroelectric signal.
Figure 2B:
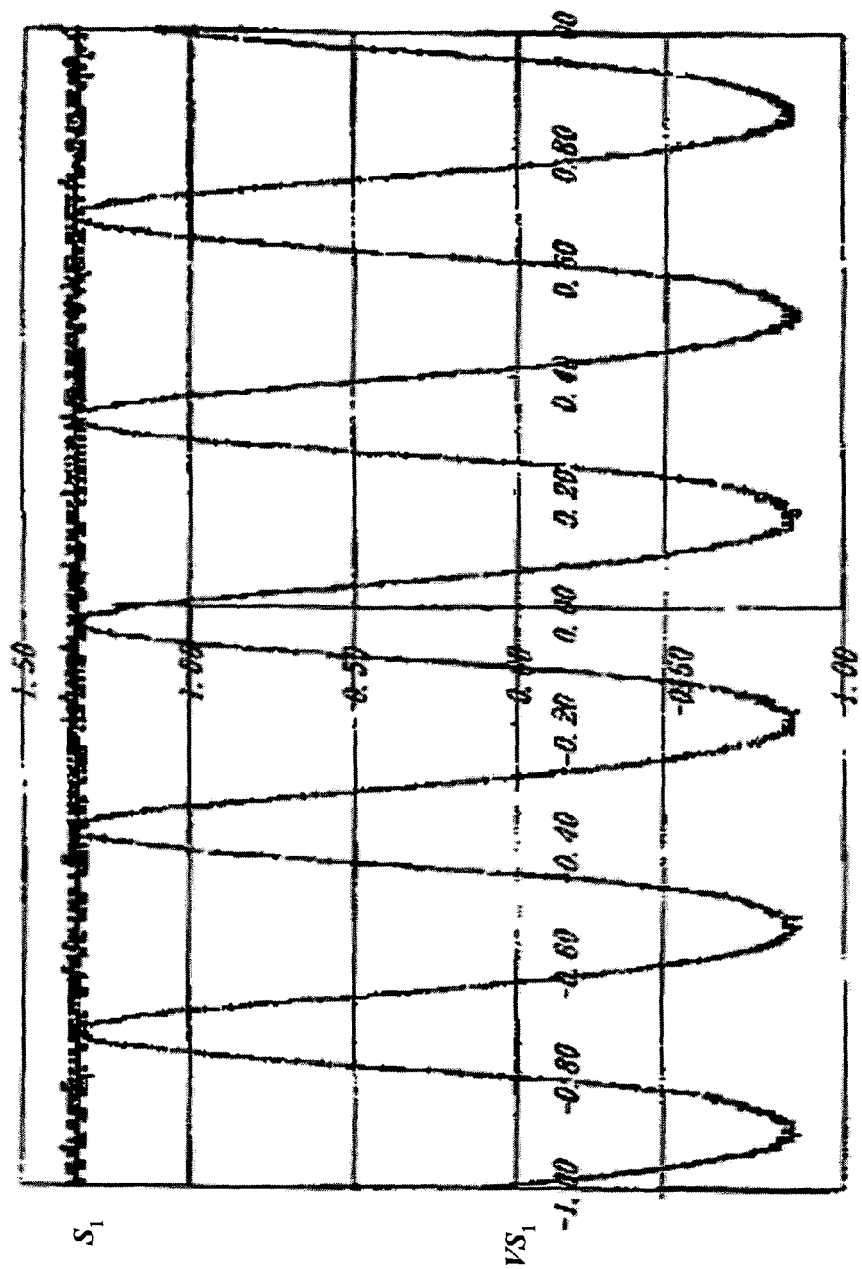
FIG. 2B is a waveform diagram showing the waveform of the output sampled signal from the first sample-and-hold circuit.

FIG. 2A is a waveform diagram used to depict how the first sample-and-hold circuit 41 is clocked by the first sampling signal S1 to sample the alternating pyroelectric output signal $V_{pyro}$ from the pyroelectric sensor module 30. As shown, the first sampling signal S1 is synchronized to the alternating pyroelectric signal $V_{pyro}$ in such a manner that each time the alternating pyroelectric signal $V_{pyro}$ reaches an upper peak, a pulse also appears in the first sampling signal S1, as progressively denoted by P1, P2, and P3 in FIG. 2A. This allows the upper peaks of the alternating pyroelectric signal $V_{pyro}$ to be sampled by the first sample-and-hold circuit 41 in response to the first sampling signal S1. FIG. 2B shows the waveform of the sampled signal VS1.

Figure 3A:
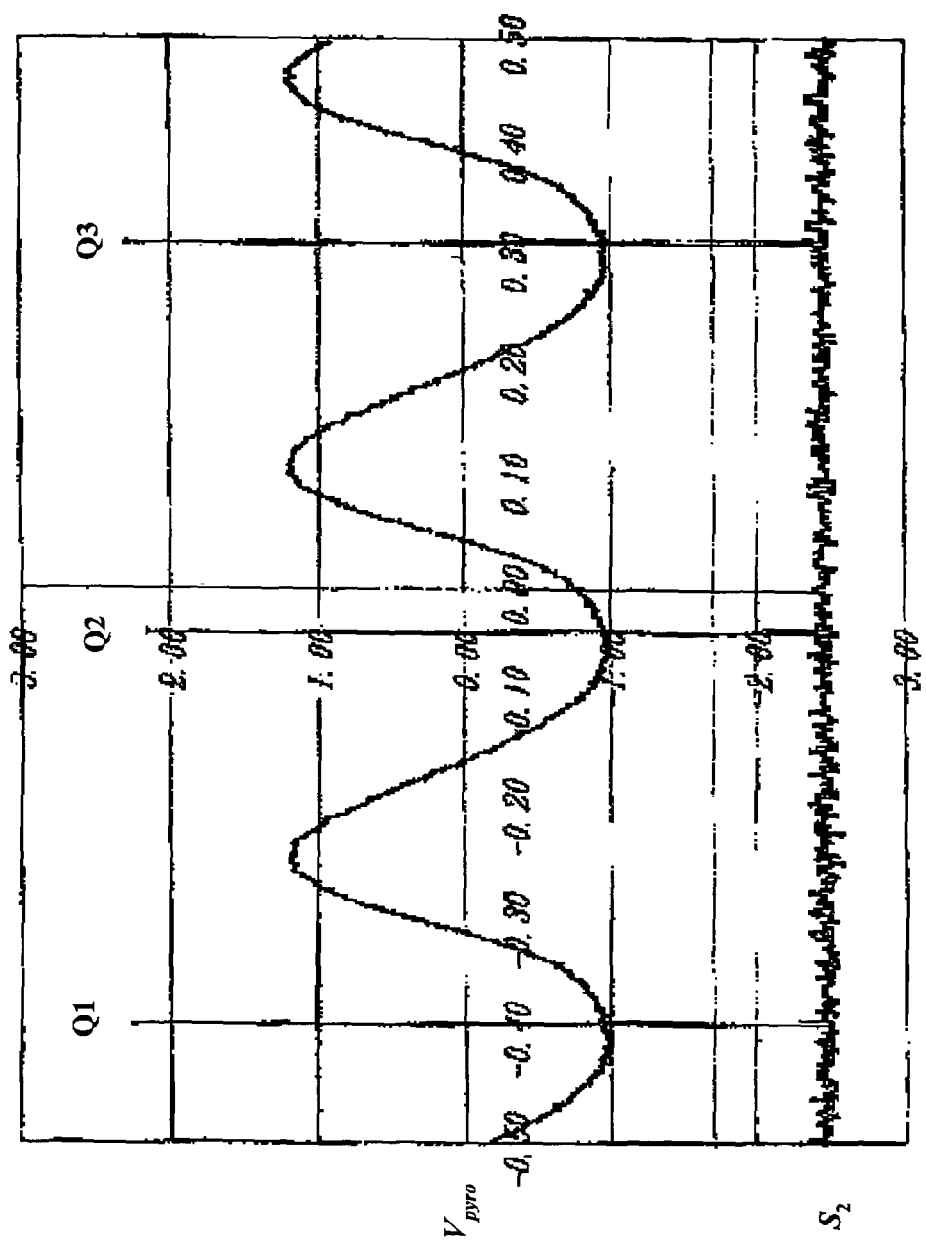
FIG. 3A is a waveform diagram used to depict how the second sample-and-hold circuit utilized by the invention is operated to sample an alternating pyroelectric signal.
Figure 3B:
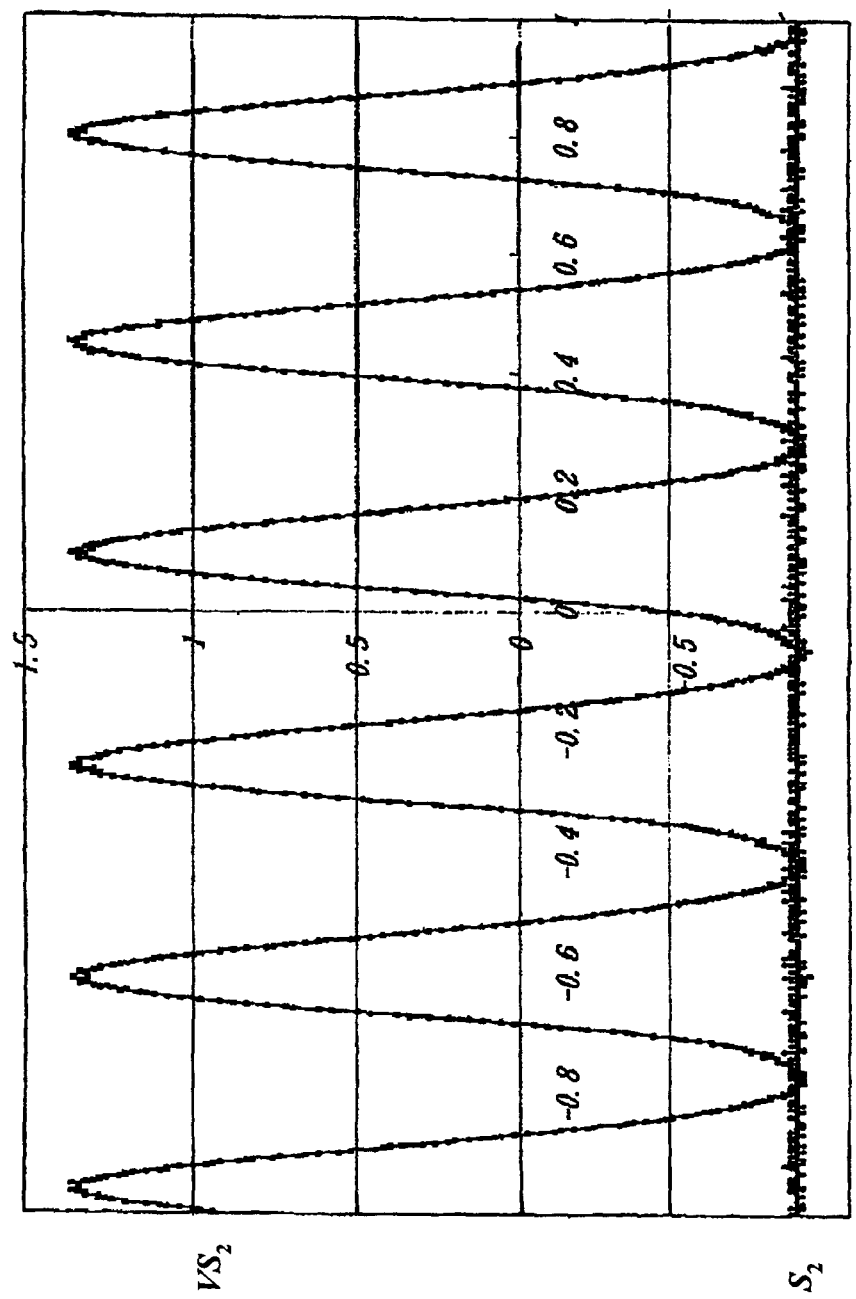
FIG. 3B is a waveform diagram showing the waveform of the output sampled signal from the second sample-and-hold circuit.

Likewise, FIG. 3A is a waveform diagram used to depict how the second sample-and-hold circuit 42 is clocked by the second sampling signal S2 to sample the alternating pyroelectric output signal $V_{pyro}$ from the pyroelectric sensor module 30. As shown, the second sampling signal S2 is synchronized to the alternating pyroelectric signal $V_{pyro}$ in such a manner that each time the alternating pyroelectric signal $V_{pyro}$ reaches a bottom peak, a pulse also appears in the second sampling signal S2, as progressively denoted by Q1, Q2, and Q3 in FIG. 3A. This allows the bottom peaks of the alternating pyroelectric signal $V_{pyro}$ to be sampled by the second sample-and-hold circuit 42 in response to the second sampling signal S2. FIG. 3B shows the waveform of the sampled signal VS2.

The sampled signal output VS1 from the first sample-and-hold circuit 41 and the sampled signal output VS2 from the second sample-and-hold circuit 42 are both transferred to the subtraction circuit 50 for further processing.

The subtraction circuit 50 is capable of performing a subtraction operation on the output sampled signal VS1 from the first sample-and-hold circuit 41 and the output sampled signal VS2 from the second sample-and-hold circuit 42, wherein each peak value of VS1 shown in FIG. 2B is subtracted from the peak value of VS2 shown in FIG. 3B to thereby obtain a difference signal which is substantially a DC signal serving as the output $V_{out}$ of the digitally-controlled pyroelectric signal sampling circuit of the invention.

In conclusion, the invention provides a digitally-controlled pyroelectric signal sampling circuit which is characterized by the use of a microprocessor in conjunction with a crystal oscillator whose operating characteristics would be substantially unaffected by temperature changes in the ambient environment. This feature allows the generated trigger signal and sampling signals to be substantially fixed in frequencies and timings, without drifting due to temperature changes in the ambient environment, and therefore allows the digitally-controlled pyroelectric signal sampling circuit of the invention to provide a more accurate DC output than prior art. Moreover, the utilization of a microprocessor in place of analog-type delay circuitry can help simplify the hardware architecture and thus save manufacturing cost. The invention is therefore more advantageous than the prior art.

The invention has been described using exemplary preferred embodiments. How-ever, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A digitally-controlled pyroelectric signal sampling circuit, which comprises:
    a trigger-signal generating unit for generating a trigger signal, a first sampling signal, and a second sampling signal, which are substantially fixed in frequencies and timings irrespective of temperature changes in the ambient environment;
    a light source module, which is triggered by the trigger signal from the trigger-signal generating unit to emit an alternating light beam;
    a pyroelectric sensor module for sensing the emitted alternating light beam from the light source module to thereby generate an alternating pyroelectric signal;
    a first sample-and-hold circuit, which is clocked by the first sampling signal generated by the trigger-signal generating unit, to sample each upper peak of the alternating pyroelectric signal from the pyroelectric sensor module and thereby generate a first sampled signal;
    a second sample-and-hold circuit, which is clocked by the second sampling signal generated by the trigger-signal generating unit, to sample each bottom peak of the alternating pyroelectric signal from the pyroelectric sensor module and thereby generate a second sampled signal; and
    a subtraction circuit for performing a subtraction operation on the first sampled signal generated by the first sample-and-hold circuit and the second sampled signal generated by the second sample-and-hold circuit to thereby obtain a difference signal;
    wherein the difference signal from the subtraction circuit is substantially a direct current (DC) output and serves as an output of the digitally-controlled pyroelectric signal sampling circuit.

2. The digitally-controlled pyroelectric signal sampling circuit of claim 1, wherein the trigger-signal generating unit comprises:
    a crystal oscillator for generating an oscillating signal; and
    a microprocessor, which is driven by the oscillating signal from the crystal oscillator to generate the trigger signal, the first sampling signal, and the second sampling signal.

3. The digitally-controlled pyroelectric signal sampling circuit of claim 1, wherein the pyroelectric sensor module further provides an amplification function capable of amplifying the alternating pyroelectric signal output therefrom by a specified gain.

4. The digitally-controlled pyroelectric signal sampling circuit of claim 1, wherein the light source module is an infrared type of light source module.

* * * * *